United States Patent [19]

Martin

[11] Patent Number: 5,028,060
[45] Date of Patent: Jul. 2, 1991

[54] UTILITY CART

[76] Inventor: David A. Martin, 14025 S. W. Bonnie Brae Ct., Beaverton, Oreg. 97005

[21] Appl. No.: 581,560

[22] Filed: Sep. 12, 1990

[51] Int. Cl.$^5$ .............................................. B62B 3/02
[52] U.S. Cl. ...................................... 280/39; 280/641; 280/87.01; 280/47.34; 280/30
[58] Field of Search .................... 280/39, 47.34, 87.01, 280/87.021, 87.043, 641, 642, 643, 651, 655, 655.1, 30, 37, 47.371

[56]  References Cited

U.S. PATENT DOCUMENTS 1,204,791  11/1916  Kyle ................................. 280/642 X
3,810,649  5/1974  Fahey, Jr. .

FOREIGN PATENT DOCUMENTS 77098  10/1948  Czechoslovakia .................... 280/39
318372  1/1920  Fed. Rep. of Germany ...... 280/641
328853  11/1920  Fed. Rep. of Germany ........ 280/39
867582  11/1941  France ................................ 280/651

Primary Examiner—Andres Kashnikow
Assistant Examiner—Brian L. Johnson
Attorney, Agent, or Firm—James D. Givnan, Jr.

[57]  ABSTRACT

A cart having a load receiving box supported by a rectangular frame inset within the box lower perimeter. End members of the frame swingably carry front and rear axle frames while side members of the frame swingably carry struts which engage the axle ends to retain some in a deployed position. The axle frame and struts are upwardly repositionable adjacent the box ends and sides, subsequent to wheel removal, to collapse the cart for storage or for carrying in a vehicle. A U-shaped handle has lower ends detachably mounted to a box end wall by a pair of sleeve structures.

6 Claims, 1 Drawing Sheet

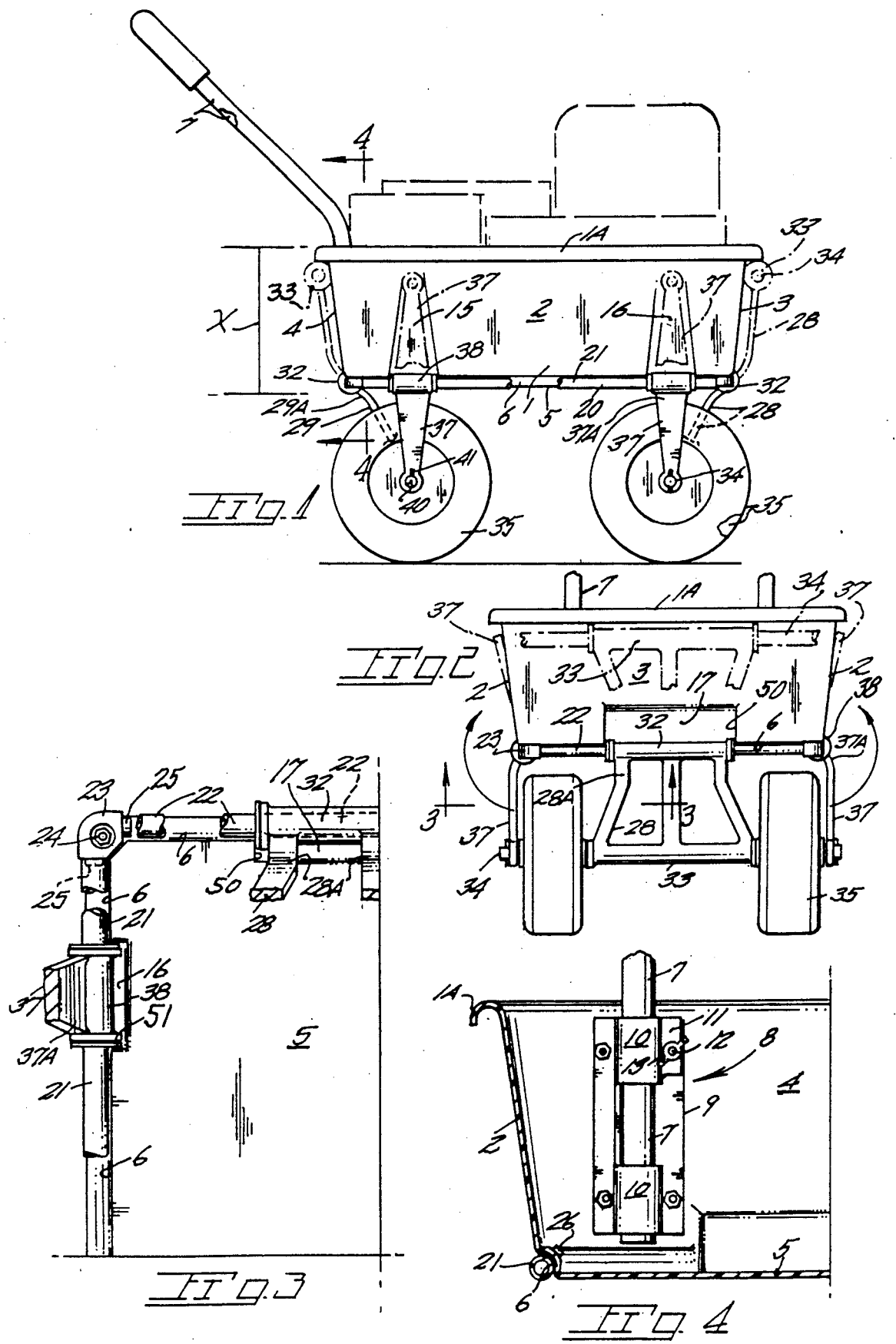

UTILITY CART

BACKGROUND OF THE INVENTION

The present invention concerns small load carrying vehicles for the transport of a wide range of articles, as for example, recreational gear and equipment and supplies used by a tradesman, etc.,.

In the prior art is an array of small, wheel equipped vehicles such as carts, wagons and wheelbarrows intended for use at one site. A problem is encountered in the transporting of such small vehicles in that they usually do not collapse and accordingly are not practical for transport in an automobile. Such vehicles are not intended to be rapidly disassembled for compact stowage in an auto or small truck.

SUMMARY OF THE INVENTION

The present invention is embodied within a utility vehicle or cart having collapsible undercarriage components which permit convenient disassembly and retraction of undercarriage components for stowage of same. Front and rear axles are maintained in a deployed downward position by struts each of which is swingable about a horizontal axis downwardly into engagement with an axle end. Cart stowage and transport is greatly facilitated by the relocating of the undercarriage components upwardly alongside walls of the cargo box subsequent to removal of the cart wheels. A handle is readily detachable from the box of the cart for stowage within the box along with the removed wheels. The frame of the vehicle extends about the perimeter of the box with frame members providing horizontal pivot means about which front and rear undercarriage frames and struts may swing.

Important objectives of the present cart include the provision of a utility cart for the transport of various articles or loads with the cart having a collapsible undercarriage permitting repositioning of undercarriage components alongside the box of the cart for cart storage and transportation purposes; the provision of a utility cart having front and rear frame members including axles which are held in a deployed position by struts swingably mounted on a frame of the cart; the provision of a utility cart wherein an undercarriage of the cart includes components readily deployed and assembled without tools; the provision of a utility cart particularly suited for transport to and use at remote locations e.g., boat docks, the beach, mountainous terrain.

BRIEF DESCRIPTION OF THE DRAWINGS

In the accompanying drawings:

FIG. 1 is a side elevational view of the present utility cart with the unseen side being a mirror image;

FIG. 2 is an end elevational view taken from the right side of FIG. 1;

FIG. 3 is a partial horizontal sectional view taken upwardly along line 3—3 of FIG. 2; and FIG. 4 is a partial vertical sectional view taken along line 4—4 of FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates a cargo box of the present cart for the reception of various articles or loads to be transported.

Box 1 includes side as at 2 and end walls at 3 and 4 all of which walls terminate upwardly in a rim 1A extending about the upper periphery of the box. A bottom wall is at 5. The lower perimeter of the box is recessed at 6 to receive a later described frame on which an undercarriage is supported.

A U-shaped handle 7 of the cart terminates within a pair of sleeve structures one of which is shown generally at 8 in FIG. 4. The remaining sleeve structure would be a mirror image of that structure shown in FIG. 4. The sleeve structure includes a base 9 with collars 10 thereon with the uppermost collar 10 having a flange 11 which overlies a portion of base 9. A threaded stud 12 on base 9 protrudes through flange 11 to receive a wing nut 13 to permit clamping of the sleeve 10 against one member of the U-shaped handle.

The cargo box sidewalls 2 are formed with recessed areas at 15 and 16 to receive later described undercarriage components. Similarly end walls 3 and 4 have recessed portions particularly shown at 17 in FIG. 2 to receive undercarriage frames later described. The recessed areas 15, 16 and 17 permit retraction of later described undercarriage components into place in proximity with the cargo box walls to facilitate both storage and transportation of the present cart.

A frame 20 extends about the lower perimeter of the cargo box in the aforementioned recess 6 formed therein. The frame comprises tubular side members at 21 as well as tubular end members at 22 in FIG. 2. Both the frame side members and end members are secured to the box by corner located blocks 23 which receive a bolt assembly 24 which passes upwardly through the bottom wall 5 of the box. Each of the corner mounted blocks 23 includes a pair of projections 25 on which is supported the side and end frame members 21 and 22.

Additionally said frame members may be secured by blind rivets as at 26 extending through the lower portion of the cargo box into the frame members as shown in FIG. 4.

The cart undercarriage includes front and rear frames 28–29 each including a sleeve at 32 journalled for rotation on a frame end member 22. An axle housing of the frame member is at 33. Axles at 34 extend through each housing 33 and therebeyond to receive a wheel 35.

Journalled on the frame side members 21 are front and rear pairs of struts as at 37 each having a sleeve 38 in place on the frame member to permit arcuate positioning of the struts about the horizontal axis of the frame members. Each strut has an apertured lower end or eye 40 to receive an end of axle 34 and accordingly lock the axle and its frame in place. Each axle end is cross bored to receive a locking pin 41. The struts 37 are preferably provided with a slightly curved segment at 37A for purposes of permitting strut retraction upwardly into proximity to the box side wall in the earlier described recessed areas 15 and 16. Similarly front and rear frames 28 and 29 have a slightly curved portion 28A–29A to enable positioning of the frames snugly in place along the end walls of the box as shown in broken lines in FIGS. 1 and 2. To prevent axial displacement of the undercarriage sleeves 32 and 38, the sleeves are confined by box surfaces as at 50 and 51 in FIG. 3 which partially define the recessed areas 15, 16 and 17 of the box.

When collapsed for storage, for example in the trunk of an auto, the depth of the cart is as indicated at X with the handle and wheels stowed in box 1.

While I have shown but one embodiment of the invention, it will be apparent to those skilled in the art that the invention may be embodied still otherwise without departing from the spirit and scope of the invention.

Having thus described the invention, what is desired to be secured by a Letters patent is:

1. A utility cart of knockdown construction, a box for reception of a load and having interconnecting side walls and end walls, a frame supporting said box and having interconnecting end members and side members, an undercarriage carried by said frame and including front and rear axles, wheels detachably mounted on said axles, front and rear positionable frames swingably mounted on said end members of the frame and each carrying one of said axles for manual deployment and retraction of the axles about horizontal axes, a plurality of struts each swingably carried by said side members of the frame and each having an apertured distal end for detachable engagement with an end of one of said axles to retain each axle in place against arcuate retractive movement, and said front and rear positionable frames upon detachment of said struts and upon removal of the wheels from each axle being retractable in an arcuate manner into a raised position against the box end walls and said struts positionable about horizontal axes into place against the box side walls enabling convenient transport and storage of the cart.

2. The cart claimed in claim 1 wherein said frame is continuous and disposed about a lower perimeter of said box.

3. The cart claimed in claim 2 wherein said box is recessed about said lower perimeter to receive said frame.

4. The cart claimed in claim 1 wherein the box sidewalls and end walls have recessed areas for reception of said struts and positionable frames when retracted.

5. The utility cart claimed in claim 1 additionally including a handle, sleeves on one of said end walls removably attaching said handle to said box.

6. The utility cart claimed in claim 1 wherein said box has sidewalls and end walls defining recessed areas for receiving the struts and the positionable frames of the undercarriage.

* * * * *